March 25, 1958
B. S. ALDEN
2,827,848
ROTARY FORK
Filed April 12, 1956
2 Sheets-Sheet 1
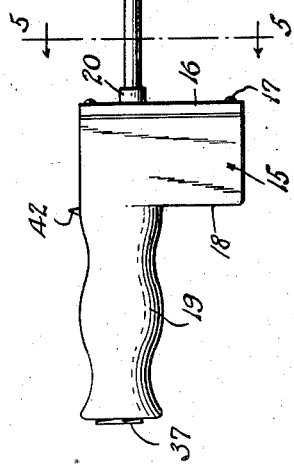
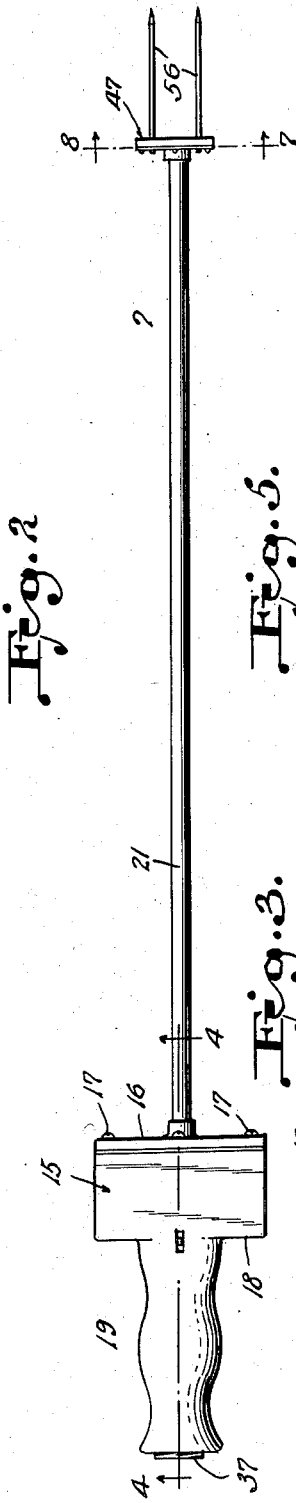
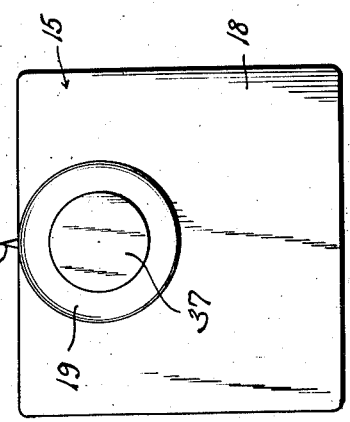
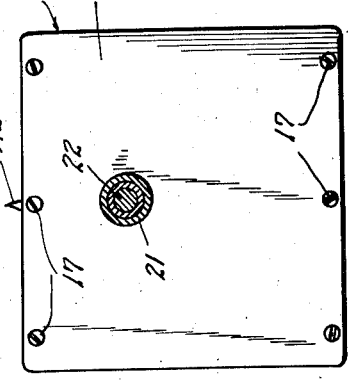
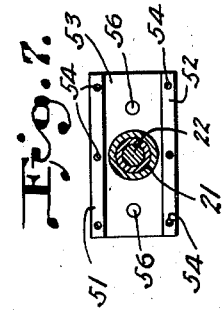
Blair S. Alden
INVENTOR
BY C. A. Snow & Co.
ATTORNEYS.

March 25, 1958  B. S. ALDEN  2,827,848
ROTARY FORK
Filed April 12, 1956  2 Sheets-Sheet 2
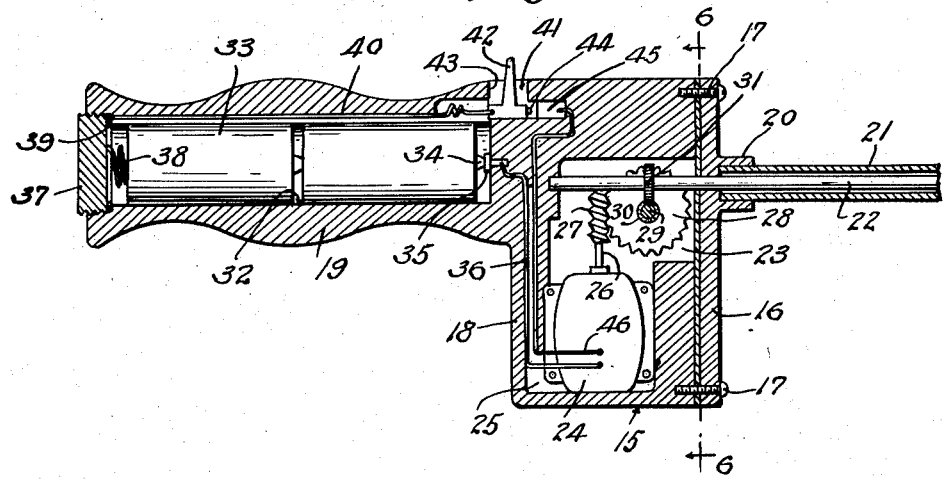
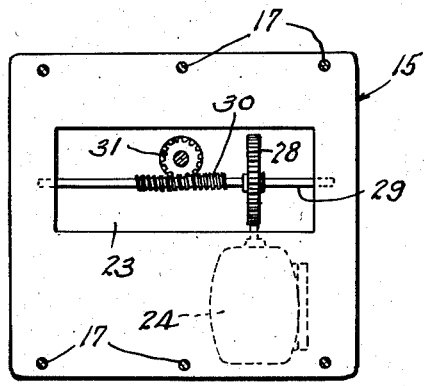
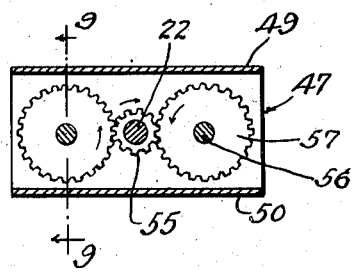
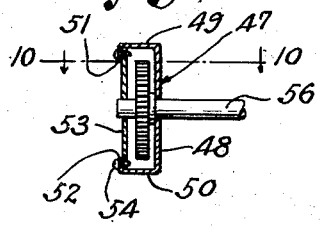
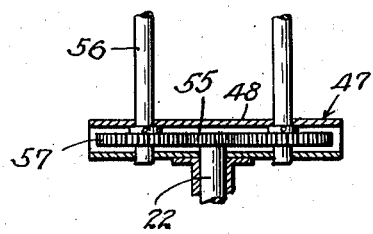
Blair S. Alden
INVENTOR
BY *CAThowles*
ATTORNEYS.

United States Patent Office 2,827,848
Patented Mar. 25, 1958

2,827,848
ROTARY FORK
Blair S. Alden, Mount Vernon, Ill., assignor to Blairco Industries, Inc., Olney, Ill., a corporation of Delaware
Application April 12, 1956, Serial No. 577,870
1 Claim. (Cl. 99—421)

This invention relates to a rotary fork or holder for cooking articles in a barbecue pit or the like.

An object of this invention is to provide an improved holder for food articles whereby the articles may be readily held in a position to be cooked by the heat of an outdoor fire, such as a barbecue pit, the device including means for rotating the food articles during the cooking process.

Another object of this invention is to provide in a rotary holder for food articles, means carried by the handle of the rotor for rotating the food articles as they are held in a position to receive the heat from the fire.

A further object of this invention is to provide a device of this kind which is of simple construction and which includes as a power source a pair of flashlight batteries which are mounted on the hollow handle of the device.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a detail side elevation of a rotary holder constructed according to an embodiment of this invention.

Fig. 2 is a plan view of the device.

Fig. 3 is a rear end elevation of the device.

Fig. 4 is a fragmentary sectional view taken on line 4—4 of Fig. 2.

Fig. 5 is a sectional view taken on line 5—5 of Fig. 1.

Fig. 6 is a sectional view taken on line 6—6 of Fig. 4.

Fig. 7 is a sectional view taken on line 7—7 of Fig. 1.

Fig. 8 is a sectional view taken on line 8—8 of Fig. 2.

Fig. 9 is a sectional view taken on line 9—9 of Fig. 8.

Fig. 10 is a fragmentary sectional view taken on line 10—10 of Fig. 9.

Referring to the drawings, the numeral 15 designates generally a rectangular housing which has a front plate 16 secured thereto by fastening devices 17. The housing 15 includes a rear wall 18 with a hollow handle 19 extending rearwardly therefrom. The front wall or plate 16 has a cylindrical bushing 20 extending therefrom with which a tubular member 21 is firmly secured. A shaft 22 is rotatably disposed in the tubular member or housing 21 and extends rearwardly through the wall or plate 16 into an inner gear chamber 23 which is formed in the housing 15. An electric motor 24 is disposed in a lower motor chamber 25 which is formed in the housing 15 and the motor 24 has a shaft 26 extending therefrom, on which a worm 27 is fixedly secured. The worm 27 engages a worm gear 28 which is mounted on a horizontal shaft 29 and the shaft 29 also includes a second worm 30 which meshes with a worm gear 31 secured on the rear portion of shaft 22. The worm 27 with worm gear 28 and worm 30 with worm gear 31 provide a speed reducing means whereby the shaft 22 will be rotated at a relatively slow speed.

The handle 19 which is formed with a cylindrical battery chamber 32 has a pair of flashlight batteries 33 disposed therein. The inner one of the batteries 33 has the center contact 34 thereof disposed in contacting relation with a terminal 35 which is carried by the forward portion of the handle 19. The terminal 35 is connected by means of a conductor 36 to one side of the motor 24. The handle 19 includes a removable plug 37 which is threaded thereinto and the plug 37 is adapted to bear against the rear end of a contact forming spring 38. A metal washer or ground contact 39 bears against the inner end of the plug 37 and contact or ring 39 is connected by means of a conductor 40 to one side of a normally open spring-pressed switch generally indicated at 41. The switch 41 includes a slidable switch member 42 which projects upwardly through a longitudinal opening 43 formed in the forward portion of the handle 19 and switch member 42 has a contact 44 disposed in confronting position to a fixed contact 45. The fixed contact 45 is connected by means of a conductor 46 to the other side of the motor 24.

The tube or housing extends forwardly and is secured to the forward gear housing 47. The housing 47 includes a front wall 48, upper and lower walls 49 and 50 and upper and lower rear flanges 51 and 52. A plate 53 is disposed on the inner sides of the flanges 51 and 52 and is secured thereto by fastening members 54. The shaft 22 extends forwardly into the housing 47 and has fixed thereon within the housing 47 a gear 55. A pair of food holding tines 56 are rotatably carried by the housing 47 extending forwardly through the forward plate 48 in parallel relation. These tines 56 are also rotatably mounted in the cover plate 53. Each tine 56 has fixed thereon within the housing 47 a gear 57 which meshes with driving gear 55. The tines or food holding members 56 are adapted to rotate in opposite directions and each tine is adapted to be projected into an article of food, such as a frankfurter.

In the use and operation of this device, the food articles such as frankfurters, are disposed on the tines 56. It will be understood that two of these frankfurters may be cooked at one time. The tube 21 and shaft 22 are made relatively long so that the user of this device grasping the handle 19 will be disposed a substantial distance from the heat of the fire. When the food articles are in position over the fire with handle 19 grasped in one hand switch member 42 may be pushed forwardly to circuit closing position so that motor 24 will rotate the food articles through the speed reducing gear train hereinbefore described.

What is claimed is:

A rotary fork comprising a housing, a handle extending rearwardly of said housing, a continuously rotatable shaft extending forwardly of said housing, a tubular housing about said shaft and concentric therewith, a gear housing fixed to the forward end of said tubular housing, a pair of driven gears rotatably mounted in said gear housing, a driving gear meshing with said driven gear mounted on said shaft and rotatable thereby, a pair of parallel tines one carried by and rotatable with each driven gear extending forwardly from said gear housing, an electric motor in said first named housing, reduction gearing connecting said electric motor with the rear end of said shaft for continuous rotation thereof, batteries in said handle, an electrical circuit connecting said batteries and said electric motor, and a switch at the forward end of said handle interposed in said electrical circuit.

References Cited in the file of this patent
UNITED STATES PATENTS

| D. 171,539 | Goodsell | Feb. 23, 1954 |
| 270,277 | Brookes | Jan. 9, 1883 |
| 1,122,466 | Beyer | Dec. 29, 1914 |
| 2,315,143 | Thompson | Mar. 30, 1943 |